J. A. FINN.
Protractors.
No. 19,356.
Patented Feb. 16, 1858.
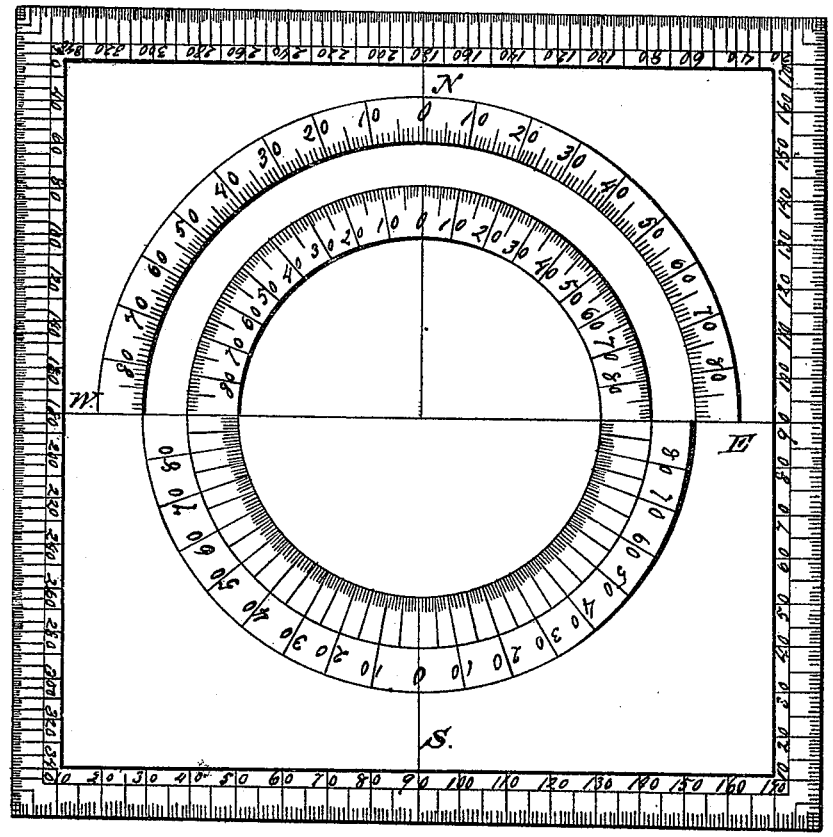

UNITED STATES PATENT OFFICE.

JOHN A. FINN, OF SIMPSON COUNTY, KENTUCKY.

SURVEYOR'S PROTRACTOR.

Specification of Letters Patent No. 19,356, dated February 16, 1858.

*To all whom it may concern:*

Be it known that I, JOHN A. FINN, of the county of Simpson and State of Kentucky, have invented a new and Improved Protracting Instrument, which I call a "Compound Protractor;" and I do hereby declare that the following is a full and exact description thereof, reference being had to the accompanying drawings and model.

My invention consists in combining together the scale for measurement and three, two concave and one convex, protractors, so that the powers of the existing instruments used for protracting and calculating the contents of a survey of land, and in laying down the lines of a rail road, &c., are united in one and the same instrument. By the combination the operator is enabled to save time and to do his work with greater accuracy.

My compound protractor may be made to order by a competent maker of instruments, of any required dimensions, and it may be either square or oblong. I prefer a square and the drawings and model herewith filed show a square, in its exterior lines six inches in length. Its accuracy will be promoted by its enlargement.

The instrument is made in the following manner:—Take a piece of wood, brass, or other suitable material of equal thickness six inches square. Upon the exterior parts of the square, there may be made four scales for laying down distances, each divided into equal parts, but of different magnitudes, so that any number of inches, poles or miles, or portions of them, may be laid down by the operator with either scale he may select. The exterior lines of the square should be perfectly straight and the divisions of the scales marked with figures as upon the drawings, herewith filed, so that the operator may determine the distance with ease and despatch. When the square and scales are thus formed, for the purpose of constructing the double or combined protractors, at the center of one of the sides of the square make a fluer de lis, or letter N to indicate the north, thence extend a line lightly engraved through the center of the square to the opposite side and there place the letter S, to indicate the south, draw a similar line at right angles to that passing from the north to the south point through the center of the square, and mark the termini with the letters E and W, to indicate the east and west points, as is shown in the drawings. Then from the center of the square, on intersection of the two lines, and upon the east and west line as the base, draw two semicircles half an inch more or less apart as may be desired on the north side of the east and west line. Cut entirely through the wood or brass used for the square upon the two lines of the semicircles, and through that part of the base line between the semicircles, and you have the form of two protractors, one concave and the other convex. Between these semicircles, bevel the edges next to the semicircles and the opening, and upon both sides of the opening mark the degrees and divisions of an ordinary protractor in the manner shown by the drawing. Then from the same center of the square draw a semicircle on the south side of the east and west line, using that line as the base. This semicircle should be drawn with a radius ¾ of an inch (more or less as may be desired) shorter than that with which the inner semicircle drawn on the north side was formed. Then cut the wood or brass embraced by the semicircle on the south side entirely out, bevel the edge of the semicircle and divide into 180 degrees, numbering them as indicated in the drawing 90 degrees on each side of the figure 0, placed at the south point, and you have a concave protractor on the south side of the east and west line. Thus three protractors are formed, two concave and the other convex, with a common center, which is the crossing of the north and south line by the east and west line, and from said crossing or point radiate the 360 degrees of a circle, as indicated by drawings. By enlarging the square and consequently the protractors, space may be obtained to subdivide the degrees into ½'s, ¼'s or ⅛'s of degrees on the protractors with accuracy. When all is done as above directed, then bevel the base of the protractors as indicated, and in the center cut by the north and south lines make a small indentation and the instrument is ready for use.

My instrument is so shaped that a revolving vernier may be placed around the edges of the protractors which will be divided into degrees, or parts of degrees, and may be used to subdivide the degrees on the protractors into minutes or seconds, also an additional sliding or folding rule may be inserted on the edge of the square, with the equal parts marked thereon, which will serve to lengthen the lines of distance upon the edge of the square, or used to subdivide the parts marked upon the edge of the square.

To enable others skilled in protracting and with the ordinary instruments to use mine I will proceed to describe the mode in which they can operate with my instrument.

The indentation in the center of the square or instrument is the beginning point to protract; then when the instrument is laid down on the paper or parchment, that point is pricked or marked on the paper and the required course is obtained, by pricking or marking on the paper that course indicated by one of the protractors be that what it may and you prick or mark that point; then with either scale on the edge of the square you extend or draw a line from the point pricked at the indentation toward or through as the case may be the point at the degree on the protractor the required distance. The instrument is adjusted for the next line by placing the indentation point at the terminus of the first line and seeing that that line cuts the reverse protractor, the course just gone reversed, and so on to the completion of the diagram or plat.

My invention is a great improvement upon instruments heretofore used for protracting surveys and lines inasmuch as it is less liable to get out of order than any I have seen or read of, and I wish to secure this improvement by Letters Patent. My instrument is a further improvement owing to the facility of erecting perpendiculars from any given point in any line when protracting and in ascertaining the shortest distance from the base of a triangle to the opposite angle in measuring the contents of such triangle, and this improvement I desire also to secure by Letters Patent. My instrument possesses another great advantage in platting and is a great improvement upon all other instruments heretofore used for that purpose, inasmuch as when adjusted it shows instantly the cardinal, and keeps them constantly before the mind of the operator, thus preventing mistakes and securing greater accuracy in laying down plats of land. This improvement I likewise desire to secure by Letters Patent.

In using my instrument the common scale and dividers may be entirely dispensed with in protracting and measuring triangles and the time lost in useing them saved.

What I claim as my invention and desire to secure by Letters Patent is—

The forming of two concave protractors and combining them with a convex protractor, square, and scale of admeasurement so as to form one instrument—by which platting of every description may be done with greater facility and equal if not superior accuracy.

JOHN A. FINN.

Witnesses:
 C. GREEN,
 LAURENCE FINN.